Aug. 25, 1964  I. JEPSON ETAL  3,146,339
CONTROLLED HEAT COOKING VESSEL
Filed March 12, 1962  3 Sheets-Sheet 1
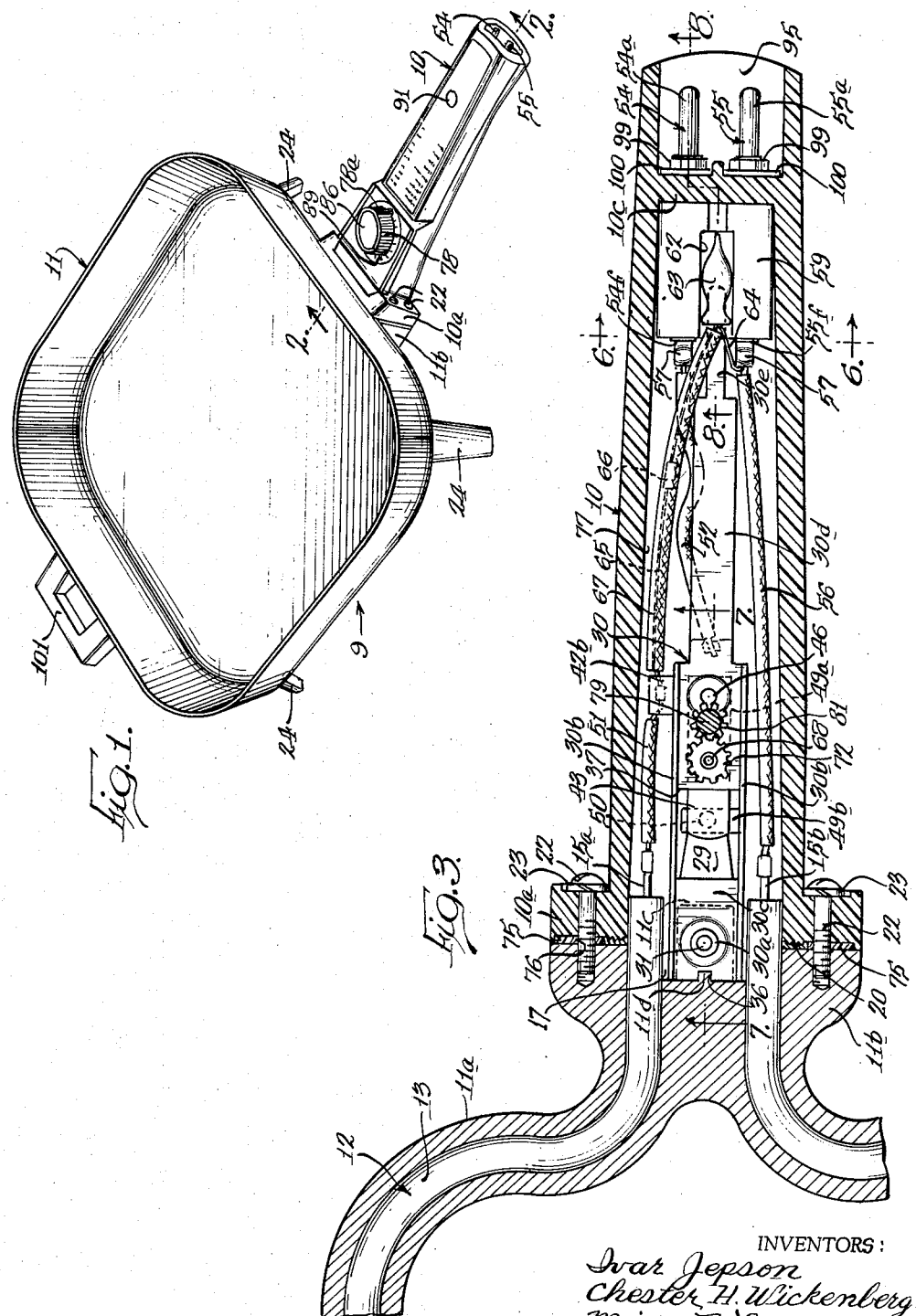
INVENTORS:
Ivar Jepson
Chester H. Wickenberg
By Moises B. Lorenzana
George R. Clark  Atty

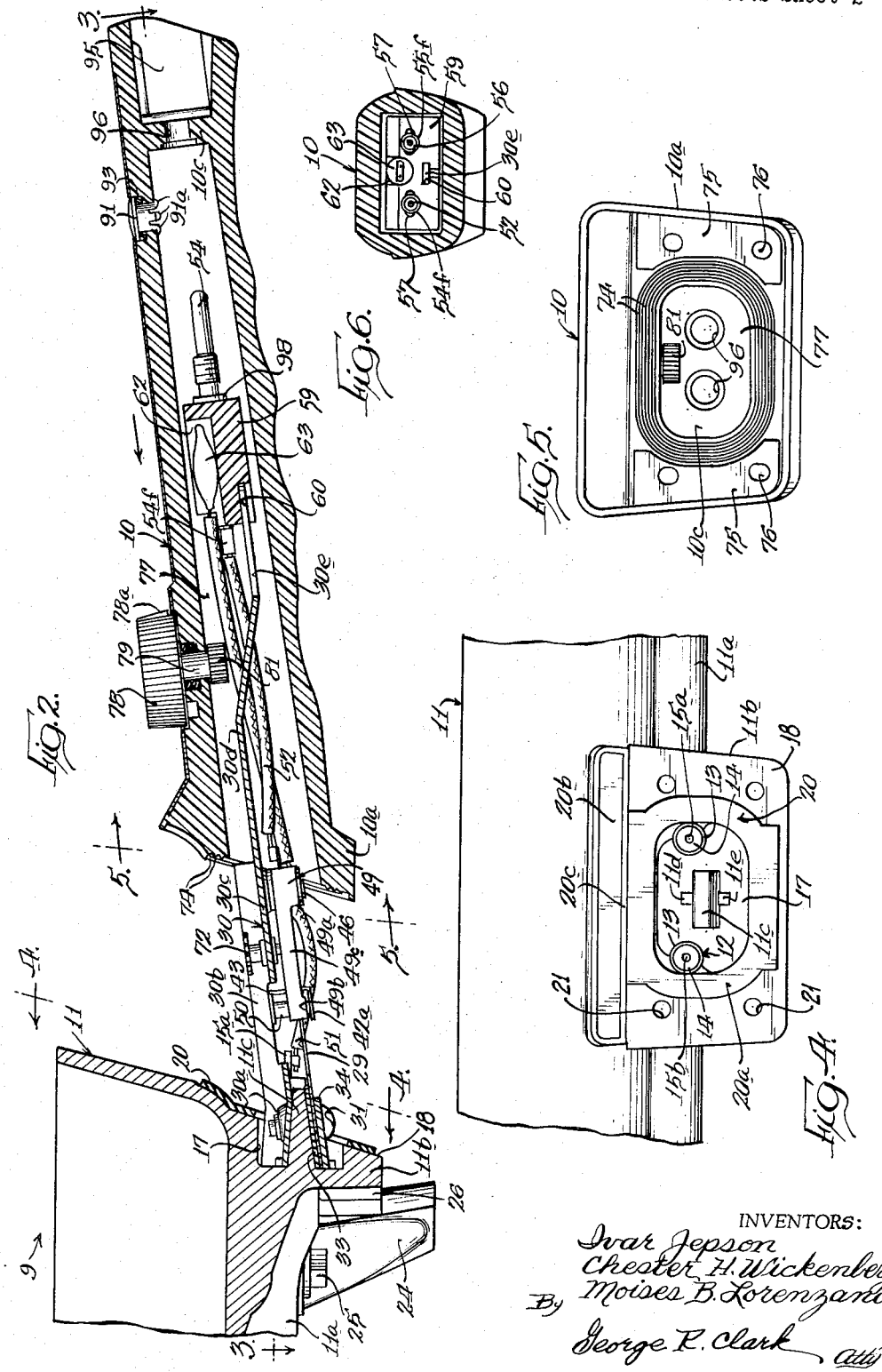

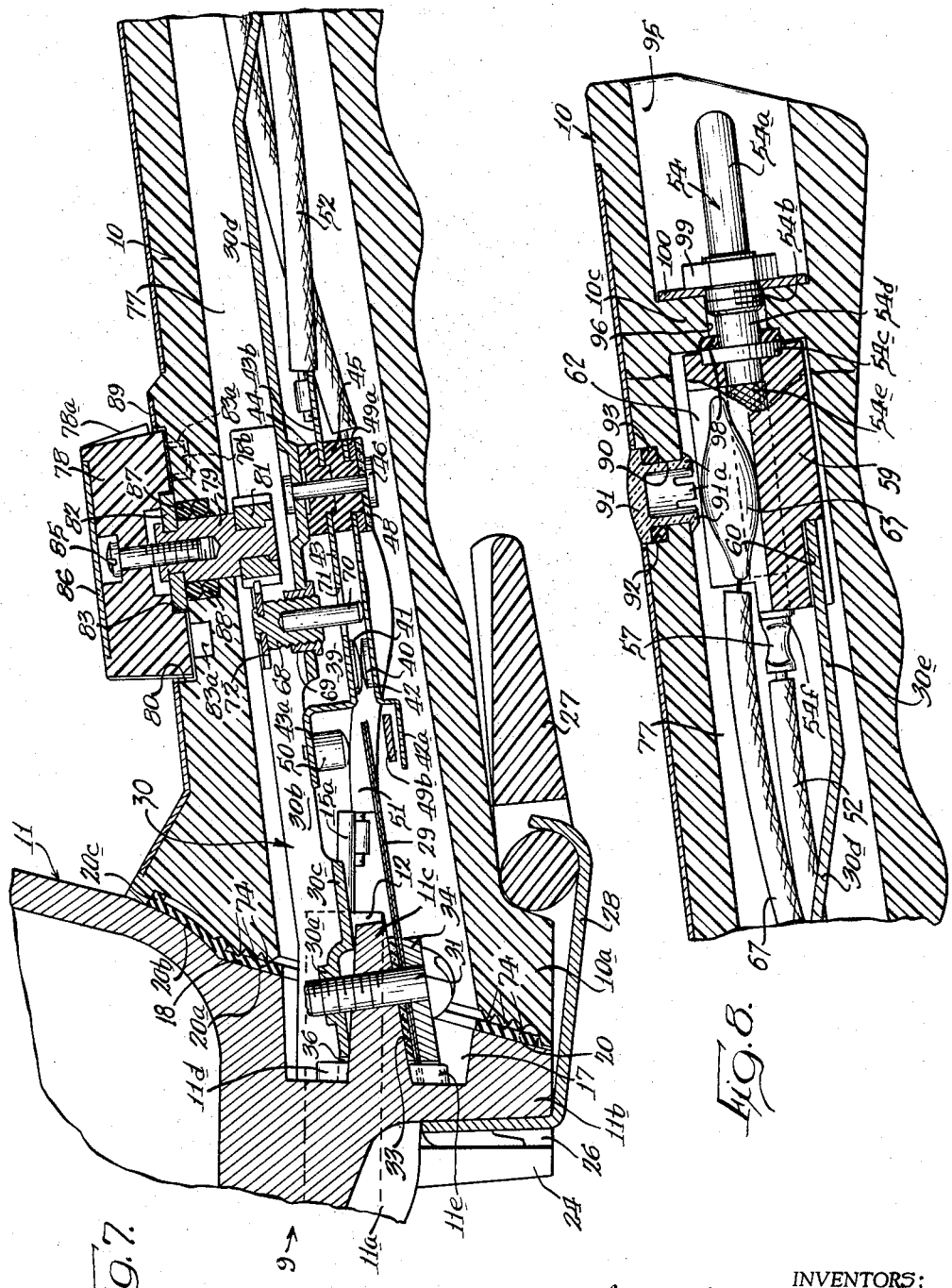

United States Patent Office 3,146,339
Patented Aug. 25, 1964

3,146,339
CONTROLLED HEAT COOKING VESSEL
Ivar Jepson, Oak Park, Chester H. Wickenberg, Elgin, and Moises B. Lorenzana, Glen Ellyn, Ill., assignors to Sunbeam Corporation, Chicago, Ill., a corporation of Illinois
Filed Mar. 12, 1962, Ser. No. 179,093
12 Claims. (Cl. 219—442)

The present invention relates to a controlled heat cooking vessel and is in the nature of an improvement on the cooking vessel disclosed and claimed in Jepson Patent 2,744,995, granted May 8, 1956, and assigned to the same assignee as the instant application.

Self-contained cooking vessels providing selective automatically controlled heat have been extensively sold ever since the invention of the above-mentioned Jepson patent, and a virtual revolution in cooking has occurred since that time. The cooking vessel of the above-mentioned Jepson patent is a completely self-contained cooking vessel wherein there is associated with the cooking vessel an electric heater and temperature control means for accurately controlling the temperature of the cooking vessel in any selected manner determined by the user thereof. The temperature responsive means for controlling the heating as well as the heating means are embodied in a single self-contained unit in the above-mentioned Jepson patent. The success of the cooking vessel of the above-mentioned Jepson patent is believed to be primarily based upon the fact that this cooking vessel and almost all of the handle thereof could be completely immersed in liquid for washing and cleaning purposes. In fact, the instructions commonly applied to commercial devices built and sold by the assignee of the above-mentioned Jepson patent recommended that the cooking vessel was completely immersible up to the control dial on the handle.

There has been a desire to produce completely immersible controlled cooking vessels including all of the handle, and to this end there was developed an electric cooking vessel in which the temperature control portion of the vessel was removable for cleaning purposes. This meant that the cooking unit effectively comprised two separable elements—the vessel portion itself and the removable control. This type of cooking vessel has been relatively successful because of the feature of immersibility thereof. In fact, today, immersibility has come to mean to the housewife the ability to completely immerse the vessel and all attached parts for washing purposes. In other words, it has come to mean sealing the vessel so that there is no danger of moisture which could cause damage to electrical parts of the device from entering the same. Several years ago immersibility did not mean that the unit could be completely dunked into water in order to be properly cleaned. However, as the popularity of electrical cooking vessels grew, there developed more and more interest in the feature of complete immersibility. This interest, however, was not so strong that housewives would tolerate the inconvenience of having to have two units, which was the case with the cooking vessels with the removable controls. On the other hand, the possibility of complete immersibility has made a very strong sales point for cooking vessels with the removable control.

It would be desirable to provide a completely self-contained controlled electrically heated cooking vessel, such as is shown in the aforementioned Jepson patent, which is completely immersible for cleaning purposes and which gives the very accurate control which was present in the cooking vessel of the aforesaid Jepson patent. Although cooking vessels with the removable control have become quite popular, they have an additional disadvantage beside the one that requires two separate parts to comprise the cooking device and that is the fact that the removable control also includes a removable temperature sensing element and the relationship of this temperature sensing element with the zone where the temperature sensing is to be done can vary due to foreign matter and the like becoming associated either with the temperature sensing element or the zone into which it is placed during a temperature controlling operation.

Since the development of silicones, there have been available sealing means capable of withstanding very high temperatures, which do not deteriorate with heat and automatically controlled cooking vessel of the type referred to above have been constructed using sealing means, gaskets or the like, formed of silicone. Generally these gaskets are employed between the handle and means integral with the vessel and of the same temperature as the vessel. When the vessel is manipulated by this handle there obviously will be a slight relative movement between the handle and vessel due to the resiliency of the interposed gasket. In prior art devices, the switch means for selectively controlling the operation of the vessel were mounted at least in part to the handle and such relative movement between the handle and vessel affected the adjustment of the switch means. It would be desirable to provide a solid mounting of the switch means, completely independent of the handle, so such relative movement of the vessel and handle would in no way affect the switch setting.

Also in cooking vessels of the automatically controlled, self-contained type, it has been common practice to cast with the cooking vessel means defining a chamber or recess at least partially disposed below the bottom of the vessel. These cast vessels have the exterior walls, other than the bottom, polished to improve the appearance thereof after manufacture since it is not generally practical to cast such vessels with the desired ultimate finish. The provision of such recesses which are defined by means extending beyond the outside walls of the vessel has prevented proper polishing, and it would be desirable to provide a cooking vessel where the means defining such recesses are completely inboard as far as the outside walls are concerned so the polishing of the sides of the vessel can be accomplished without interference from such recesses.

In the completely sealed chamber of such immersible vessels, it is important that no moisture can enter to deleteriously affect the contacts of the switch means contained therein. However, it is also important that substantially all moisture initially contained in this chamber be removed. First of all, such chambers are at least in part defined by a molded insulating handle of some sort and it is important that substantially all moisture contained therein which could enter the sealed chamber be removed before the chamber is sealed. Additionally, the heating element itself, which terminates in this sealed chamber, and which is commonly formed of the well-known sheathed construction, must not contain moisture which is given off into the sealed chamber upon use of the device.

Accordingly, it is an object of the present invention to provide a new and improved electrically heated cooking vessel.

It is another object of the present invention to provide a new and improved electrically heated automatically controlled cooking vessel which is completely self-contained and completely immersible for cleaning purposes.

It is a further object of the present invention to provide an automatically controlled completely self-contained electrically heated cooking vessel which is simple and inexpensive to manufacture and which will give many long and troublefree years of service, and, furthermore, which is completely immersible for cleaning purposes.

Still another object of the present invention resides in a completely immersible self-contained thermostatically controlled cooking vessel wherein the thermostatically controlled switch is solidly mounted independent of the handle of the vessel so that the switch setting is unaffected by slight movements of the handle relative to the vessel.

Still another object of the present invention resides in an automatic completely immersible self-contained thermostatically controlled cooking vessel employing a hollow slip-on handle.

It is still another object of the present invention to provide a new and improved cooking vessel including a recess defined by walls integrally formed with the cooking vessel, which recess is disposed inboard of the sides of the cooking vessel.

It is a still further object of the present invention to provide an automatically temperature controlled cooking vessel which is completely immersible for cleaning purposes, including compressible gasket means for performing the sealing operation together with insulating means for preventing overcompression of the gasket means.

It is a further object of the present invention to provide a completely immersible self-contained automatically controlled cooking vessel which not only has a completely sealed chamber for the controls but wherein substantially all the moisture initially contained in this chamber is removed prior to sealing thereof.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings, in which:

FIG. 1 is a perspective view of an electric cooking vessel embodying the present invention;

FIG. 2 is a fragmentary sectional view taken substantially on line 2—2 of FIG. 1, but showing the slip-on handle in a disassembled position illustrating an assembly step with respect to such handle;

FIG. 3 is a fragmentary sectional view taken substantially on line 3—3 of FIG. 2, but assuming that FIG. 2 not only shows the complete structure, but is in the assembled condition of FIG. 1 of the drawings;

FIG. 4 is a view looking in the direction of the arrows 4—4 of FIG. 2, assuming that FIG. 2 shows the complete structure with, however, the switch supporting frame and the electrical connections removed but with the sealing gasket in place;

FIG. 5 is a view of the end of the handle looking in the direction of the arrows 5—5 of FIG. 2, assuming that FIG. 2 shows the complete structure and assuming that the switch supporting frame is completely removed;

FIG. 6 is a sectional view taken on line 6—6 of FIG. 3, assuming that FIG. 3 shows the complete structure;

FIG. 7 is a greatly enlarged fragmentary view taken on line 7—7 of FIG. 3, again assuming that FIG. 3 shows the complete structure; and FIG. 8 is an enlarged fragmentary sectional view taken on line 8—8 of FIG. 3, again assuming that FIG. 3 shows the complete structure.

Briefly, the present invention is concerned with an electric heating or cooking unit comprising a container or vessel portion of square configuration which may be formed as a stamping but preferably is formed of cast aluminum with an electric heating element cast integrally therewith. Also cast integrally therewith are means defining a recess or control chamber into which the terminals of the heating element extend which means and chamber are disposed at least partially beneath the bottom of the vessel and inboard of the sides of the vessel. A switch frame is rigidly supported from a lug within this recess so that all of the controls are mounted on the switch frame. A hollow slip-on handle is then provided which slips over the frame and in doing so a control knob mounted on the handle makes driving connection with an adjustable setting means. Sealed connections are provided at the terminals and at the junction between the handle and the vessel. The cooking unit is a completely waterproof unit whereby the vessel and handle may be completely immesed in liquid for cleaning purposes.

Referring now to the drawings, there is illustrated an electric cooking unit, generally indicated by the reference numeral 9. This cooking unit comprises a handle 10 connected to a shallow open-top vessel or container 11, illustrated as of substantially square configuration except that the four corners are smoothly rounded to make cleaning a simple problem. The cooking unit 9, as illustrated, is what is commonly termed a frying pan but obviously it might comprise any other type of cooking or heating unit. Preferably, the vessel 11 is cast from a metal, such as aluminum, providing a very good heat conductor and, insuring uniform temperature of the heating or cooking surface thereof.

For the purpose of providing heating means in intimate heat exchange relationship with the bottom of the vessel 11, there is provided an electric heating element 12 (FIGS. 3 and 4) which is preferably cast within a rib 11a in the form of a loop defined on the underside of the vessel 11. This rib may be cast integrally with the vessel as described in the above-mentioned Jepson patent, but preferably is of the configuration disclosed and claimed in copending Jepson and Wickenberg application, Serial No. 166,289, filed January 15, 1962, and assigned to the same assignee as the instant application. The heating element 12 is preferably one of the well-known sheathed heating units which conventionally comprises an outer metal sheath within which is disposed a suitable length of resistance wire coiled in the form of a helix. Surrounding the coiled resistance wire within the sheath is a refractory composition commonly formed of fused magnesium oxide which centers the resistance element and which, furthermore, is a good conductor of heat and yet an excellent electrical insulator. The sheath of the sheathed electrical heating element 12 is visible in FIGS. 3 and 4 of the drawings and is designated by the reference numeral 13. Also the refractory composition is visible in FIG. 4 and is designated by the reference numeral 14. This refractory composition also surrounds a portion of the terminals, designated as 15a and 15b, which project from the end of the sheathed heating element 12. As illustrated in the drawings, the ends of the sheathed heating element project through walls 11b cast integrally with the vessel 11 which walls define a recess or chamber 17, best shown in FIGS. 2, 3, 4 and 7 of the drawings. As is best shown in FIG. 3 of the drawings, the ends of the sheathed heating element 12 are not only disposed within the recess or chamber 17 but actually extend beyond a wall 18 of the recess-defining wall portion 11b, which wall 18 defines the open side of the chamber 17 and comprises a plane surface to make sealing engagement with one end of the handle 10, as described hereinafter. In accordance with the present invention, this wall 18 is inboard of the side walls of the heating vessel 11, as is clearly indicated in FIG. 7 of the drawings, which means that the outside of these side walls may readily be polished without interference from the walls defining such recess 17 as was the case with many prior art devices.

Projecting into the recess or chamber 17 and integrally formed with the walls 11b is a combined heat lug and switch supporting member 11c. For a purpose which will become apparent from the ensuing description, additional integral lugs or key members 11d and 11e are provided which are small lugs projecting from the same wall as lug 11c, one immediately above and the other immediately below this combined heat and switch supporting lug 11c. The plane wall 18 defines a sealing surface for a sealing gasket 20 formed of a resilient material which is capable of withstanding high temperatures without deterioration. One such material is what is commonly termed as silicone rubber. As best shown in FIG. 4 of the drawings, the gasket 20 includes a closed loop portion 20a of somewhat oval configuration, the inner dimension of which conforms somewhat to the opening into the recess 17. The gasket 20 further includes a sort of a rectangular portion 20b integrally joined to the top of portion 20a which rectangular portion is bounded by a raised rib 20c, best shown in FIGS. 4 and 7 of the drawings, to define a sort of hollow portion. The surface of gasket 20 on the side engaging wall 18 is flat throughout its entire area including both portions 20a and 20b. The portion 20b thereof is primarily for sanitary purposes to prevent food from being trapped between the vessel 11 and handle 10 and extends above the wall 18 and into engagement with the exterior of the side wall of the vessel 11, as best shown in FIGS. 2 and 7 of the drawings. The portion 11b is provided with a plurality of tapped openings 21 opening on the wall 18. The tapped openings 21, referred to above, are for receiving suitable fastening means, such as bolts 22, for securing the slip-on handle 10 to the vessel 11, the gasket 20 being interposed between the handle 10 and the vessel 11, as clearly shown in FIGS. 3 and 7 of the drawings. Lock washers 23 (FIG. 3) of the split spring type are provided to maintain the desired sealing pressure and to compensate for differential expansion and contraction of the bolts 22 and handle 10. The handle tends to shrink with aging and the bolts 10 expand with heating. In a device built in accordance with the present invention, the gasket 20 was formed of a silicone rubber having a hardness of approximately fifty durometers, with the portion 20a having a thickness of between seventy and seventy-five thousandths of an inch.

In order to support the cooking unit 9, from any suitable surface which might or might not be heat resistant, such as tables or other furniture, the vessel 11 is provided with a plurality of supporting legs 24, preferably formed of a suitable phenolic resin, and secured to the bottom of the vessel in any suitable manner, such as by bolts 25 (FIG. 2). The construction of these legs forms no part of the present invention and may be like that disclosed in the copending Jepson and Wickenberg application referred to above.

If desired, the integral depending portion 11b of the cooking vessel 11 may be provided with means defining opposed grooves 26 (FIGS. 2 and 7 of the drawings) for supporting the fifth leg 27 secured by a resilient spring element 28, a portion of which is disposed in the grooves 26 in the manner disclosed and claimed in a copending Wickenberg application Serial No. 15,323, filed March 16, 1960, and also assigned to the same assignee as the instant application. This arrangement permits the level of one side of the vessel to be raised to cause any liquid contained therein to move to the other side.

For the purpose of maintaining the temperature of the cooking surface of the vessel 11 at some constant selected temperature, it is essential that there be provided suitable temperature responsive control means. Such temperature responsive control means must be responsive directly to the temperature of the bottom of the vessel 11 and preferably should control suitable switch means for interrupting the power supplied to the electric heating element 12. In accordance with the present invention, such temperature responsive control means and electrical circuit associated therewith is supported from the lug 11c completely independent of the handle 10. To this end, there is supported from the combined heat lug and switch supporting member 11c, a bimetallic element 29 and an elongated frame or switch supporting element 30. As best illustrated in FIG. 7 of the drawings, the lug 11c is provided with an opening therethrough for receiving a threaded fastening means or screw 31 for clamping both the bimetallic element 29 and the frame 30 to the stud 11c. In order to provide the desired thermal lag a suitable insulating member 33 in the form of a thin layer of mica is interposed between the portion of bimetallic element 29 underlying the heat lug 11c and heat lug 11c.

It will be understood that bimetallic element 29 will respond to the temperature of heat lug 11c which in turn is representative of the temperature of the cooking surface of vessel 11. A clamping plate 34 of relatively rigid material is provided on the other side of this portion of bimetallic element 29 and preferably the end of the frame 30 is provided with a thickened area 30a (FIG. 7) which is tapped to threadedly receive the fastening means 31 whereby the clamping member 34, the bimetallic element 29, the mica insulating thermal lag element 33, lug 11c, and frame 30 are clamped in stacked relationship as clearly indicated in FIG. 7 of the drawings. So that the single clamping screw 31 may hold all these elements in rigid assembled relationship to lug 11c, the end of the frame 30 disposed within the recess 17 is provided with a notch 36 to receive the lug 11d and, hence, prevent pivotal movement of the frame 30 about the axis of the fastening means 31. This is best shown in FIGS. 3 and 7 of the drawings. Similarly the end of the bimetallic element 29 disposed within the chamber 17 and the corresponding portions of the clamping plate 34 and insulator 33 are notched to receive the lug 11e, to similarly prevent rotation of these elements about the axis of the fastening means 31. The high expansion side of the bimetallic element 29 is disposed on the underside, as viewed in FIG. 7 of the drawings, so that with heating the free end thereof tends to move upwardly.

The frame 30 is a rigid elongated member which includes a channel-shaped portion adjacent the end disposed within the recess 17 in order to furnish the desired rigidity. This channel-shaped portion is clearly shown in FIG. 3 of the drawings, where the sides of the channel are designated as 30b and the bight of the channel is designated as 30c. The thickened portion 30a is defined in the bight 30c of the channel-shaped portion. To permit certain action which will become apparent hereinafter, a portion of the bight 30c is cut away to define a large opening 37 (FIG. 3) in the frame 30. The frame 30 further includes an elongated tongue portion 30d extending from the end of the channel-shaped portion remote from the recess 18 and this tongue portion terminates at its free end in a narrow tang 30e. In accordance with the present invention, all of the elements of the electrical circuit and control therefor exclusive of the heating element 12 and bimetallic element 29 are supported from the frame 30.

For the purpose of selectively controlling the temperature of the heating or cooking surface in response to deflection of the bimetallic element 29, there is provided a switch assembly generally designated at 39 (FIG. 7), comprising a pair of relatively movable contacts 40 and 41. The contact 40 might be considered the stationary contact although it is selectively adjustable, as will be pointed out hereinafter, but when once adjusted it remains stationary whereas the contact 41 may be considered the movable contact since it is intended to be moved in response to predetermined deflections of bimetallic element 29. As illustrated best in FIG. 7 of the drawings, the relatively movable contacts 40 and 41 are mounted on switch or contact blades 42 and 43, respectively, which contact blades are supported in spaced insulated relationship from the frame 30. To this end the contact blades 42 and 43 are disposed in spaced relationship by insulating spacer members 44 and 45 and are clamped in insulated stacked relationship to frame 30 by a suitable rivet 46, as best shown in FIG. 7 of the drawings. Preferably this stack includes a lower insulating washer 48 and a U-shaped temperature limiting arm or stop element 49 having a pair of arms 49a and 49b interconnected by a bight portion 49c. The arm 49a specifically is clamped by the rivet 46 and the arm 49b extends above a projection 42a of contact blade 42. The element 49 is a safety device in the event switch 39 becomes defective. It limits the upward movement of the lower contact or switch arm 42 so that the relatively movable contacts 40 and 41 would be opened by the bimetallic element 29 when the temperature reached 500° F.

In order that the bimetallic element 29 may cause movement of the movable contact 41, the contact blade 43 is provided with an L-shaped projection 43a supporting an insulating projection 50 disposed in the path of the bimetallic element 29. The L-shaped projection 43a is disposed in the window or opening 37 defined in the channel portion of frame 30. This arrangement provides a more compact mounting arrangement.

To permit electrical connection to be readily made with the switch blades 42 and 43, the switch blade 42 is provided with a lateral projection 42b, best shown in FIG. 3 of the drawings, and the switch blade 43 is provided with a rearward projection 43b, best shown in FIG. 7 of the drawings. The terminal 15a of the sheathed heating element 12 is connected by an insulated conductor 51 with the portion 42b of the switch blade 42, as clearly indicated in FIG. 3 of the drawings. The switch blade 43, on the other hand, is connected by an insulated conductor 52, which is suitably secured to the projection 43b thereof to a terminal stud 54. An identical terminal stud 55 is connected by an insulated conductor 56 with the terminal 15b of the sheathed heating element 12. Terminal studs 54 and 55 are identical so only the terminal stud 54, best shown in FIG. 8 of the drawings, will be described in detail. It comprises a portion 54a which is in the form of the well-known male type bayonet connector. It furthermore comprises a threaded portion 54b immediately adjacent the portion 54a and a shouldered portion 54c spaced from the threaded portion 54b by a short section 54d. It furthermore includes a knurled portion 54e which extends from the shouldered portion 54c almost to the opposite end thereof and terminates in a hollow connector portion 54f. The portions 55a and 55f of the terminal stud 55 corresponding to the portions 54a and 54f of the terminal stud 54 are clearly shown in FIG. 3 of the drawings. The ends of the insulated conductors 52 and 56 adjacent the terminal studs 54 and 55 are inserted into the recess defined in tubular portions 54f and 55f, respectively, whereupon these tubular portions are crimped by a suitable crimping tool as indicated at 57 (FIGS. 3, 6 and 8) to insure good electrical connection.

In accordance with the present invention, the knurled portions of terminal studs 54 and 55 are molded into a terminal block 59 of suitable insulating material so that these terminal studs are held in spaced parallel relationship. The terminal block may be formed of a suitable molded insulating material but is designed to rigidly support the terminal studs with the shouldered portion 54c flush with one end of the terminal block, as best shown in FIG. 8 of the drawings, and the ends 54f and 55f projecting from the other end of the terminal block. In order that the terminal block 59 may suitably be supported from the frame 30, it is provided with a recess 60, best shown in FIG. 8 of the drawings, for receiving the end of the tang 30e, thereby supporting the block but permitting some slight relative movement with respect to frame 30. In other words, terminal block 59 is loosely or rockably supported on the end of frame 30.

It is generally desirable in automatically controlled cooking vessels to have some sort of an indicating light to indicate whether the heating element is "on" or "off." To this end the terminal block 59 is molded with a sort of cradle arrangement defining a top recess 62 in the upper surface thereof, as best shown in FIG. 3 of the drawings, to support a suitable neon or other indicating light 63. It will be appreciated that to perform the function set forth above such indicating light should be connected across the terminals 15a and 15b of the electrical heating element 12 so that when the heating element is energized, the light 63 will similarly be energized. To this end one terminal of the light 63 is connected by a conductor 64 (FIG. 3) to the portion 55f of the terminal stud 55 which, of course, is connected to terminal 15b by conductor 56. The other terminal of the light 63 is connected by means of a conductor 65 and a current limiting resistor 66 to the projection 42b of switch blade 42, which in turn is connected to the terminal 15a of heating element 12 by conductor 51. Preferably an insulating sleeve 67 encloses the conductor 65 and the current limiting resistor 66.

For adjusting the switch 39 comprising relatively movable contacts 40 and 41 so that the bimetallic element 29 will open this switch at certain selected temperatures, there is provided an adjusting screw 68 (FIG. 7) threadedly mounted in a bushing 69 suitably supported by the frame 30. An insulating pin 70, preferably formed of a ceramic or the like, is adapted to extend through an opening 71 in switch blade 43 to engage the switch blade 42, as clearly shown in FIG. 7 of the drawings. It will be apparent that rotation of the adjusting screw 68 will cause axial movement thereof and, consequently, axial movement of the pin 70, thereby to change the position of the stationary contact 40 as the user of the device may select. For the purpose of rotating the adjusting screw 68, there is provided a gear 72 secured to the upper end thereof, which gear is disposed between the flanges 30b of the channel portion of frame 30.

From the above description it will be apparent that the entire temperature responsive control means and associated circuit are supported primarily from the lug 11c either directly therefrom or from frame 30 which is mounted directly thereto, and the whole control is completely independent of the handle as far as support is concerned, as is readily apparent from FIG. 2 where the handle is partially removed.

The handle 10 of the present invention may have any configuration, but has been illustrated as of the configuration shown in patent Des. 191,971, Ernest and Reed, granted December 19, 1961, and assigned to the same assignee as the instant application. In accordance with the present invention, the handle 10 might be defined as a hollow slip-on handle or sleeve which in no way supports any parts of the elements but merely encloses them in a suitable completely sealed housing so that the entire unit 9 may be immersed in liquid for cleaning purposes. The portion of the handle 10 which is intended to make sealing engagement with the wall 18 by virtue of interposed gasket 20 is of somewhat rectangular configuration, as indicated at 10a, so as to conform to the shape of the wall portion 18. Effectively, therefore, the portion 10a includes lateral flanges with suitable openings for receiving the fastening members 22, clearly shown in FIGS. 1 and 3 of the drawings. To insure a good seal with the portion 20a of the gasket 20, the cooperating end of the handle 10 is provided with a plurality of closely but uniformly spaced saw-toothlike ridges 74 in the shape of an oval to define V-shaped grooves between the ridges, as best shown in FIGS. 5 and 7 of the drawings. These ridges, three being shown in the drawings, will, of course, press into the resilient sealing member 20 at three spaced oval lines so as to provide three spaced seals around the entire opening of the sealed chamber 17. In other words, a sort of labyrinth seal is provided.

It is desired that the resilient sealing member 20 be subjected to somewhere between ten and twenty percent of the maximum compression it will sustain and to limit this compression suitable spacer members 75 are employed, one on either end of the gasket 20, as best shown in FIGS. 3 and 5 of the drawings. These spacer members are preferably made of a high quality molded phenolic material which will not deteriorate when subjected to high temperatures since they engage directly with the wall 18 of the cooking vessel 11. These spacer plates 75 are also provided with suitable openings 76 for permitting the fastening means 22 described above to pass therethrough. The thickness of the members 75 relative to the gasket 20 is such that from ten to twenty percent of the permissible compression will be exerted on the gasket when the spacer members become tightly clamped between the end of the handle 10 and the wall 18. It should be understood that the spacer members 75 might be integrally molded as a part of the handle 10 and not comprise separate members. However, these spacer members must be formed of a molded material which will withstand high temperatures and in a device built in accordance with the present invention, they were made as separate members so that the handle portion could be molded from a less-expensive insulating material. By making the spacers as separate members they and gasket 20 can readily be replaced without replacing the more expensive handle 10, should the seal for any reason deteriorate. It will be appreciated that when the cooking vessel is moved around by lifting it with the handle 10 that a change in the compression of the gasket 20 will occur and slight relative movement will occur between the handle 10 and the vessel 11. However, the labyrinth seal described above will insure that such movement will not in any way affect the seal for preventing moisture from entering the chamber 17 or the chamber 77 defined within the hollow slip-on handle 10.

When the hollow slip-on handle is moved into position, as indicated by the arrow in FIG. 2 of the drawings, it is essential that gear 72 be drivingly connected to suitable control means exterior of the handle. To this end there is rotatably mounted on the handle 10 a suitable control knob 78 which is secured to a control knob shaft 79 journalled within an opening defined in the upper side of the handle 10 and having one end extending into handle chamber 77. The knob 78 is disposed within a shallow circular recess 80 defined in the top wall of handle 10. Secured to the end of the control knob shaft 79 within the chamber 77 is an axially elongated gear 81 capable of driving engagement with gear 72. Secured to the upper end of the control knob shaft is a serrated washer 82 which is adapted to be received within a circular recess 83 defined in the underside of the control knob 78, the periphery of which recess 83 is provided with serrations mating with those on the serrated washer 82, whereby the control knob may be selectively positioned in any desired angular relationship with respect to the control knob shaft 79 and secured thereto by suitable fastening means 85. So that the fastening means 85 is not visible and to provide a pleasing appearance a suitable knob insert 86 may be secured adhesively or otherwise to the top of the knob 78, as clearly indicated in FIG. 7 of the drawings.

So that no moisture may enter the opening in handle 10 through which control knob shaft 79 is journalled, this opening is provided with what might be considered a counterbore for receiving a pair of control knob shaft O-rings 87 and 88. These O-rings are compressed between the serrated washer 82 and the bottom of the recess defined by the counterbore surrounding the opening for the knob shaft 79. Preferably the O-rings 87 and 88 are coated with a silicone grease having a viscosity of the order of 250 centistokes to insure a waterproof seal. Also the exterior of shaft 79 should be smooth and means must be provided to prevent tilting of this shaft in the opening in handle 10, such as, a close fit between the shaft 79 and the opening in handle 10 therefor.

It will be understood that the knob 78 will be provided with a suitable pointer, such as 78a (FIGS. 1 and 7), cooperating with suitable indicia indicated at 89 in FIGS. 1 and 7 of the drawings. Preferably a discontinuous annular extension 83a of recess 80 is defined in the handle beneath the knob 78 for receiving a stop pin 78b integrally formed with the knob 78 which limits the angular rotation of the knob 78 to something less than three hundred and sixty degrees. In one extreme position of the knob, which might be called the "off" position, the gear 81 drivingly engaging the gear 72 moves the ceramic pin 70 downwardly in FIG. 7 to a sufficient extent to open the switch 39 at normal ambient temperatures.

It will be apparent with the arrangement described that when the slip-on handle 10 is moved from the position of FIG. 2 to the position of FIG. 7 that the gear 81 will loosely mesh with the gear 72 in a manner that relative movement of the handle 10 and vessel 11, due to variations in the compression of the gasket 20, will not affect the driving relationship between these gears.

In order that the indicating light 63 may be visible from the exterior of the handle 10, the latter is provided with an opening 90, as best shown in FIG. 8 of the drawings, overlying the light 63 when the handle is assembled to the cooking vessel 11. A suitable transparent nylon lens 91 having a plurality of resilient locking prongs 91a is adapted to be inserted into this opening. The opening 90 is provided with a counterbore 92 molded in the handle for receiving a sealing member in the form of an O-ring 93 which engages a shoulder in the lens 91. The lens with the O-ring assembled thereon is pushed into the opening 90 and the resilient locking prongs 91a engage the inside of the handle surrounding the opening and sealingly secure the same in position. If desired, a suitable sealing element, such as an epoxy resin, may be employed to improve the seal.

So that electrical connection can be made to the terminal studs 54 and 55, they must project outside the handle. To provide a terminal recess, the handle 10 includes a partition 10c adjacent the end thereof remote from the vessel 11 at a sufficient distance from the end to define a plug receptacle or recess 95. The wall 10c is provided with a pair of spaced openings, such as the opening 96, best shown in FIG. 8 of the drawings, through which the terminal studs 54 and 55 may project. The inside wall of the partition 10c is provided with counterbores adjacent the openings 96 for receiving terminal stud O-rings or other sealing members 98 which can be compressed between the shoulder portion 54c or 55c of the terminal studs 54 and 55 and the bottoms of the counterbores just discussed. Preferably O-rings 98 have a rectangular cross section for good sealing action (FIG. 8). The desired compression of these O-rings is obtained by applying suitable nuts 99 to the threaded portions 54b and 55b of the terminal studs 54 and 55, as clearly indicated in FIG. 8 of the drawings. Preferably metal clamping plates, such as 100, formed of stainless steel or the like are disposed between the partition 10c and the nuts 99. Thus, the terminal studs 54 and 55 and the terminal block 59 are rigidly secured to the handle 10. However, by virtue of the loose connection between the tang 30e and the recess 60 in the terminal block 59, relative movement between the handle and the vessel 11 can occur without in any way affecting the switch setting. Preferably the handle 10 is molded with the underside thereof shaped to fit the hand of the user, as clearly indicated in FIG. 2, and as also illustrated in the above-mentioned Ernest and Reed design patent.

As has been pointed out above, it is very important not only that no moisture enter the recess 17 and associated chamber 77, but that substantially all the moisture is removed before the seals are completed. Consequently, it is important that the sheathed heating element 12 be free of moisture since with heating any moisture contained therein will be driven out and, of course, will enter the chambers 17 and 77. Furthermore, the material from which the handle 10 is made should not give off moisture with heating. Preferably, the handle 10 is baked for a number of hours at a temperature above that to which it will be subjected and the sheathed heating elements likewise are heated to drive off all moisture and are then maintained in a dry atmosphere before assembly.

The cooking unit 9 has been illustrated as having on the side opposite thereof from the handle 10 another supporting handle 101, commonly referred to as an auxiliary handle suitably secured to the vessel to facilitate handling the cooking vessel by the user.

In view of the detailed description included above, the operation of the present invention will readily be understood by those skilled in the art. The sealing arrangements described insure a completely sealed arrangement in a single unit which may be completely immersed in liquid for cleaning purposes and by completley immersed meaning not only the vessel but the associated handle as well. This arrangement, furthermore, avoids the requirement of a separate removable control unit with the disadvantages inherent in such construction. With the solid mounting arrangement of the switch frame independently of the handle, the switch setting is unaffected by slight movement of the handle relative to the cooking vessel. Moreover, this arrangement provides a flexible connection between the control knob and the means for adjusting the contacts and also a flexible connection between the terminal support and the rest of the mechanism. The hollow slip-on handle lends itself to simple manufacturing techniques and the assembly operation is a very simple one by merely moving the handle into place, completing the seal where the handle joins the vessel and completing the seal where the terminal lugs come through the wall 10c of the handle. It will be understood that the pressure within chambers 17 and 77 is both above and below atmospheric pressure depending upon whether the vessel is hot or cold. With the arrangement described the seals satisfactorily maintain this pressure differential over long years of use.

While there has been illustrated and described a single embodiment of the present invention, various changes and modificaitons will occur to those skilled in the art and it is intended in the appended claims to cover all such changes and modifications as fall within the true spirit and scope of the present invention.

What is claimed as new and desired to be secured by Letters Patent of the United States is:

1. An electric heating unit fully immersible in liquid for cleaning purposes comprising a vessel having integral wall means defining a chamber, an electric heating element in intimate heat exchange relationship with the underside of said vessel and having portions thereof extending into said chamber, selectively adjustable thermostatic switch means rigidly supported from within said chamber including temperature control means, said switch means extending outside said chamber, a hollow slip-on handle enclosing said switch means, means for securing said handle to said wall means, manually adjustable temperature selecting means mounted on said handle extending in sealed relationship therethrough and making a loose driving connection with said temperature control means, said driving connection being disconnectable upon the mere removal of said handle from its position enclosing said switch means, said handle including a first portion for engaging said wall means, and a silicone rubber sealing gasket interposed between said first portion and said wall means, said first portion being provided with a plurality of spaced endless ridges for engaging one side of said sealing gasket to provide a labyrinth seal between said handle and said wall means, said gasket being approximately seventy-five thousandths of an inch in thickness and having a hardness of approximately fifty durometers, and relatively incompressible spacer plate means interposed between said handle and said wall means for limiting the maximum compression of said gasket to between approximately ten and twenty percent of the maximum compression that said gasket will sustain.

2. The electric heating unit of claim 1 wherein the means for securing said handle to said wall means comprises a plurality of bolts and a plurality of split spring type lock washers to maintain the desired sealing pressure on said gasket and to compensate for differential expansion and contraction.

3. In an electric cooking unit the combination of a vessel provided with a wall portion formed integrally therewith and defining a chamber, a combined heat lug and switch supporting member integrally formed with said wall portion extending into said chamber, an electrical heating element secured to the underside of said vessel having the ends thereof extending into said chamber, an elongated frame extending out of said chamber and having one end rigidly secured to said member, a switch assembly including a temperature adjusting means supported from said frame, a bimetallic element rigidly mounted from said member and positioned to actuate said switch assembly at preselected temperatures, a hollow slip-on handle positioned over said frame switch assembly and bimetallic element, means for securing said handle in sealed relationship to said wall portion, terminal means extending through said handle and rigidly supported thereby, said frame extending to said terminal means, said terminal means being loosely supported on said frame, flexible electrical conductor means electrically connecting said terminal means in electrical circuit with said switch assembly and said electrical heating element, and manually actuatable means extending through said handle flexibly connected with said adjusting means, whereby the setting of said switch assembly is unaffected by slight movement of said handle relative to said vessel.

4. The combination of claim 3 wherein a thin layer of insulating material is positioned between said bimetallic element and said member to produce a thermal lag.

5. An electric cooking unit comprising a vessel having an integral projecting defining wall means, an electric heating element on the underside of said vessel and having terminals extending from said wall means, an elongated rigid frame projecting from said vessel and having one end secured to said wall means, thermostatic switch means supported from said frame at an intermediate position thereon and including selectively adjustable temperature control means, an elongated hollow slip-on handle positioned over said switch means and frame and secured to said wall means, manually actuatable temperature adjusting means mounted on said handle making a loose driving connection with said temperature control means, and terminal members extending through one end of said handle and flexibly connected within said hollow handle in electrical relation with said switch means and heating element, said elongated frame extending for substantially the full length of said handle to said terminal members in said handle, said terminal members being supported by the end of said frame remote from said one end at least during the assembly of said handle with said vessel.

6. The electrical cooking unit of claim 5 wherein said handle includes a portion for engaging said wall means, and a sealing gasket interposed between said handle portion and said wall means, said handle portion being provided with a plurality of spaced endless ridges for engaging the side of said sealing gasket to provide a labyrinth seal between said handle and said wall means.

7. An electric cooking unit comprising a vessel provided with a wall portion formed integrally therewith and defining a chamber, a combined heat lug and switch supporting member integrally formed with said wall portion extending into said chamber, an electrical heating element secured to the underside of said vessel having the ends thereof extending into said chamber, a switch frame rigidly supported from said member, a switch assembly supported by said frame and including an upper and lower contact blade carrying respective upper and lower relatively movable contacts and supported from said frame, an adjusting screw threadedly mounted relative to said frame and including an insulating pin extending through an opening in said upper contact blade to engage and position said lower contact blade, gear means secured to said adjusting screw for rotating said adjusting screw, a bimetallic element rigidly mounted from said member and positioned to move said upper switch contact in response to a predetermined deflection thereof, a hollow slip-on handle forming a handle chamber positioned over said switch assembly and bimetallic element and secured to said wall portion to close said first-mentioned chamber, terminal means extending through said handle and supported in fixed spaced relationship relative to said handle, said terminal means being loosely supported relative to said switch frame, conductor means electrically connecting said terminal means in electric circuit with said switch assembly and said electrical heating element, a control shaft extending through said handle, control knob means on the outer end of said shaft for selectively setting said shaft, and an axially elongated gear secured to the inner end of said shaft so as to be disposed in driving engagement and loosely meshed with said first-mentioned gear when said handle is secured to said wall portion, whereby the mere removal of said handle from said switch assembly disconnects the driving engagement of said gears.

8. The electric cooking unit of claim 7 wherein a stop element limiting the upward movement of said lower contact is provided so that said contacts are always opened by the bimetallic element when a predetermined temperature is reached.

9. An electric cooking unit comprising a cooking vessel provided with a wall portion formed integrally therewith and defining a chamber, an electric heating unit secured to the underside of said vessel having ends thereof extending into said chamber, a combined integral heat lug and switch supporting member projecting from said wall into said chamber and including additional upper and lower integrally formed lugs projecting from said wall and respectively positioned immediately above and immediately below said integral heat lug, a switch frame rigidly mounted from said member and provided with a notch receiving one of said additional lugs to prevent pivotal movement of said switch frame, a switch assembly including temperature selecting and control means supported from said frame, a bimetallic element rigidly mounted from the other side of said member positioned to actuate said switch assembly at the preselected temperature and provided with a notch receiving the other of said additional lugs thereby to prevent pivotal movement of said element, a hollow handle forming a handle chamber positioned over said switch assembly and bimetallic element and secured to said wall portion to close the first-mentioned chamber, terminal means extending rigidly through said handle, said terminal means being loosely supported relative to said switch assembly, flexible electrical conductor means electrically connecting said terminal means in electrical circuit with said switch assembly and heating element, and means extending through said handle flexibly connected with said selecting and control means so that the setting of said switch assembly is unaffected by relative movement between said handle and said vessel.

10. The electric cooking unit of claim 9 wherein a single bolt means passing through said switch frame, bimetallic element and member fastens said frame and bimetallic element to said member.

11. An electric cooking unit comprising a vessel having integral wall means defining a control chamber, an electrical heating element secured to the underside of said vessel in heat exchange relationship therewith and extending into said control chamber, a frame rigidly supported from within said chamber, switch means rigidly supported from said frame and including temperature selecting and control means, a hollow handle positioned over said frame and switch means and secured to said wall means, said handle being provided adjacent one end with a partition forming a plug receptacle, means defining spaced openings in said partition, manually actuatable means extending through said handle and making a loose driving connection with said temperature selecting and control means, a terminal block of insulating material loosely supported from one end of said frame, a pair of spaced terminals extending through said blocks, means securing said terminals in said spaced openings of said partition, and means electrically connecting said terminals with said switch means and heating element.

12. The electrical cooking unit of claim 11 wherein said frame includes an elongated tongue portion terminating in a narrow tang, and wherein said terminal block is provided with a recess, said tang being loosely received in said recess.

References Cited in the file of this patent

UNITED STATES PATENTS

| | | |
|---|---|---|
| 301,512 | Mixer | July 8, 1884 |
| 1,980,335 | Hewitt et al. | Nov. 13, 1934 |
| 2,307,440 | Wilson | Jan. 5, 1943 |
| 2,565,638 | Victory | Aug. 28, 1951 |
| 2,653,834 | Purkhiser | Sept. 29, 1953 |
| 2,744,995 | Jepson | May 8, 1956 |
| 2,823,293 | Levine | Feb. 11, 1958 |
| 2,839,662 | Theisen | June 17, 1958 |
| 2,860,229 | Ziegler | Nov. 11, 1958 |
| 2,872,561 | Humphrey | Feb. 3, 1959 |
| 2,927,189 | Purpura | Mar. 1, 1960 |
| 2,931,884 | Jepson et al. | Apr. 5, 1960 |
| 3,051,808 | Reffel | Aug. 28, 1962 |

FOREIGN PATENTS

| | | |
|---|---|---|
| 1,208,746 | France | Sept. 14, 1959 |